United States Patent [19]

Levoy

[11] Patent Number: 4,561,735

[45] Date of Patent: Dec. 31, 1985

[54] EYEGLASS FRAME HINGE

[76] Inventor: Barton M. Levoy, 130 Cutter Mill Rd., Great Neck, N.Y. 11022

[21] Appl. No.: 607,176

[22] Filed: May 4, 1984

[51] Int. Cl.[4] .......................... G02C 5/22; G02C 5/14
[52] U.S. Cl. .................................... 351/153; 351/121
[58] Field of Search ................... 351/121, 153; 16/228

[56] References Cited
U.S. PATENT DOCUMENTS 2,121,572 6/1938 Polden et al. ...................... 351/153

Primary Examiner—Rodney B. Bovernick
Attorney, Agent, or Firm—Bauer & Amer

[57] ABSTRACT

A hinge for the temple piece of an eyeglass frame that uses two hinge members that assemble with each from the side, thus facilitating achieving an interfitting relation with each other, and in which an extension of the stationary hinge member projects into a notch of the pivotally movable hinge member to contribute to the strength of the hinge and also functioning as a stop for the pivotal traverse thereof.

3 Claims, 7 Drawing Figures

EYEGLASS FRAME HINGE

The present invention relates generally to an improved hinge for an eyeglass temple piece, and more particularly to a hinge which avoids the use of plural interfitting ears which in a conventional hinge mounts the hinge pin, and instead contemplates a greatly simplified assembly that nevertheless does not lessen the strength and durability of the hinge.

As understood, a hinge capable of withstanding the wear and stress of frequent pivotal movement of an eyeglass temple piece about a hinge pin relies on interfitting ears with appropriate aligning openings through which the hinge pin is projected to establish a pivot axis for the temple piece. While the number of such ears, being as many as five in some instances, contribute to the structural stability of the hinge, the need to mount the hinge pin through the aligning openings complicates the assembly of the hinge, and also increases the cost.

Broadly, it is an object of the present invention to provide a strong and durable eyeglass hinge that is nevertheless easily assembled, and otherwise overcomes the foregoing and other shortcomings of the prior art. Specifically, it is an object to provide interfitting hinge structure which contributes to the strength and durability thereof, but which does not have the hinge pin projected therethrough, and thus lends itself to facilitated assembly, as well as providing other advantages as will be more fully disclosed herein.

An improved hinge for pivotally interconnecting a temple piece to an eyeglass frame demonstrating objects and advantages of the present invention includes for each hinge a first rectangular hinge member having a top, a bottom and opposite side legs bounding a rectangular compartment. A second hinge member having adjacent one end a laterally extending trunion block sized to be projected within said rectangular compartment is assembled, from the side, to the first hinge member. Next a hinge pin is disposed vertically through the first hinge member top and bottom and the second hinge member trunion block so as to mount the second hinge member for pivotal traverses about the hinge pin. As an effective substitute for numerous interfitting ears, the hinge hereof has a cooperating notch in the second hinge member trunion block in aligning relation to receive therein a projection into said compartment from one of the side legs of the first hinge member, such that said interfitting notch and projection contribute to supporting the second hinge member during the pivotal traverses thereof just as effectively as the interfitting ears of a typical prior art hinge.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
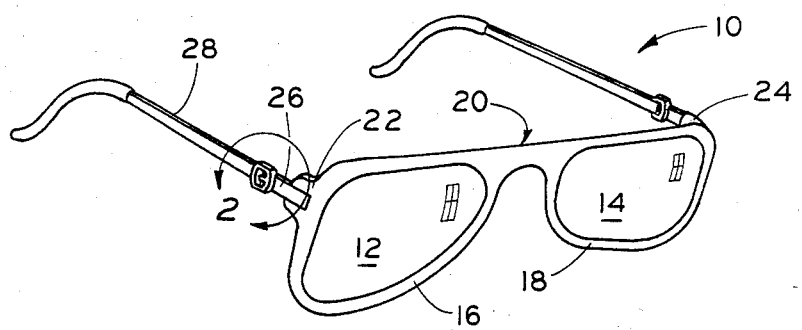
FIG. 1 is a perspective view of a pair of glasses embodying the inventive improved hinge.

Illustrated in FIG. 1 is a pair of eyeglasses 10 having lenses 12 and 14 respectively mounted in ring portion 16 and 18 of an eyeglass frame generally designated 20. At opposite sides of the frame 20 there are rearwardly extending portions 22 and 24 which each receive, as best illustrated by rearward extension 22 in FIG. 2, a stationary or first hinge member 26. Pivotably interconnected to each hinge member 26 is a second hinge member 28, the hinge connection therebetween generally designated 30, constituting the crux of the within invention. More particularly, hinge 30 is noteworthy in the manner in which it obviates any possibilities of shearing of the hinge pin, and yet it is extremely simple in its construction and very easy to assemble.

Figure 2:
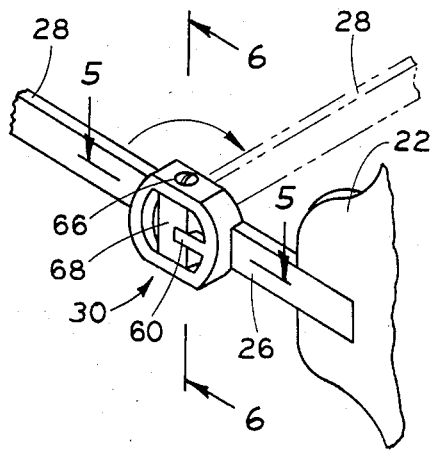
FIG. 2 is a partial perspective view, on an enlarged scale, showing the hinge as noted within the detailed reference arrow 2 of FIG. 1.
Figure 3:
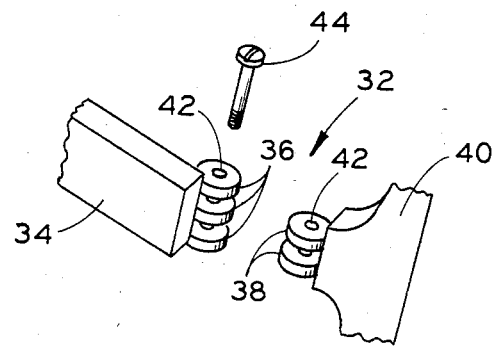
FIG. 3 is a perspective view intended for comparison with FIG. 2, illustrating an equivalent prior art hinge.

That is, and is perhaps best illustrated by reference to FIG. 2, it has the equivalent structural stability of the prior art hinge 32 which on the temple piece 34 has three ears, individually and collectively, designated 36. These ears interfit with two cooperating ears, individually and collectively designated 38, at the end of the eyeglass frame 40. Completing the prior art hinge 32 are the necessary aligning openings 42 for the hinge pin 44. With greatly simplified structural features, both as to cost of manufacture and ease of assembly, the inventive hinge 30 hereof nevertheless has the structural stability of the rather complicated five-ear prior art hinge 32 of FIG. 3.

Figure 4:
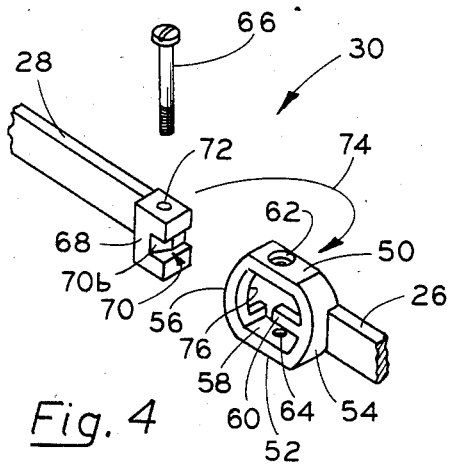
FIG. 4 is an exploded perspective view of the inventive hinge hereof, showing further structural details.
Figure 6:
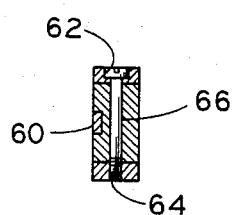
FIG. 6 is another sectional view, taken along line 6—6 of FIG. 2, showing further structural details of the hinge.
Figure 7:
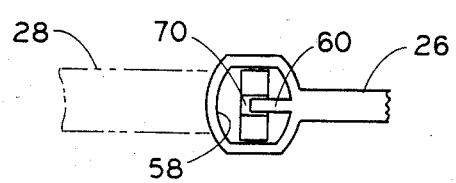
FIG. 7 is a partial elevational view, as taken along line 7—7 of FIG. 5, illustrating the hinge when the temple piece is positioned in substantially parallel relation to the ring portions of the eyeglass frame.

The inventive hinge 30 hereof, as best shown in FIG. 4, is characterized by a construction at one end of the hinge member 26 which is of a rectangular configuration that includes a top leg 50, a bottom leg 52, and opposite side legs 54 and 56 which bound therebetween a rectangular compartment 58. Projecting into the compartment 58 from the side leg 54 is a stabilizing projection 60, the function of which will soon become apparent. Completing the construction at the end of the hinge member 26 are upper and lower openings 62 and 64, the latter being threaded so as to threadably receive the bottom threaded end of the hinge pin 66, as best illustrated in FIG. 6.

The other hinge member 28, which it will be recognized is essentially the temple piece of the eyeglass 10, is provided at its end remote from the earpiece with what can be aptly characterized as a trunion block 68. Block 68 will be understood to be sized to fit within the compartment 58 and has what is essentially an L-shaped notch 70 at a location adapted to receive the previously noted projection 60. Completing the construction of the block 68 is a vertical bore 72 for the hinge pin 66.

As is indicated by the reference arrow 74 in FIG. 4, the block 68 of the hinge member 28 is adapted to be assembled with the hinge member 26 from a lateral direction, with the projection 60 projecting into the notch 70 and with the openings 62, 72 and 64 aligning with each other for insertion of the hinge pin 66 therethrough.

Figure 5:
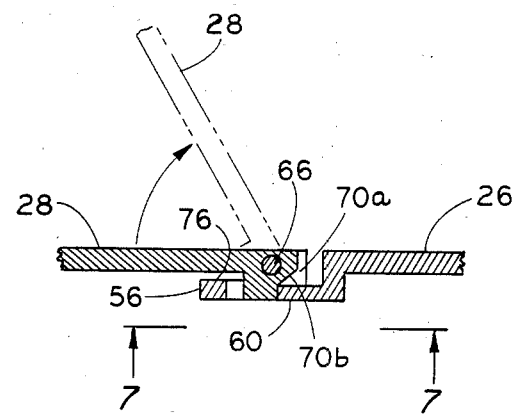
FIG. 5 is a sectional view, taken along line 5—5 of FIG. 2, showing additional structural details of the hinge and also showing positions of movement of the temple piece in full line and phantom line perspective.

In the assembled condition of the two hinge members 28 and 26, which comprises the hinge 30, and, more particularly, with the projection 60 within the leg portion 70a of notch 70, all as is best illustrated in FIG. 5, it has been found that this condition provides stability and strength to the hinge 30 during pivotal traverses of the temple piece 28. Also, when the temple piece 28 is extended into its position directly rearwardly of the hinge member 26, as illustrated in full line in FIG. 5, the projection 60 at this time is then seated in the notch portion 70b, and thus functions as a stop which limits the pivotal traverse of the temple piece 28 during the time that it is positioned directly rearwardly of the hinge member 26.

It is also to be noted, particularly in FIG. 5 and FIG. 4, that the side 56 bounding the compartment 58 is provided with a vertical notch 76 to receive the temple piece 28 therein, so that member 28 can align directly rearwardly of member 26 when the eyeglasses 10 are being worn.

A latitude of modification, chamge and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. An improved hinge for pivotally interconnecting a temple piece to an eyeglass frame comprising for each hinge a first rectangular hinge member having a top, a bottom and opposide side legs bounding a rectangular compartment, a second hinge member having adjacent one end a laterally extending trunion block sized to be projected within said rectangular compartment, a hinge pin having an operative position disposed vertically through said first hinge member top and bottom and said second hinge member trunion block so as to mount said second hinge member to partake of pivotal traverses about said hinge pin, and a cooperating notch in said second hinge member trunion block in aligning relation to receive therein a projection into said compartment of one of said side legs of said first hinge member, whereby such interfitting notch and projection contribute to supporting said second hinge member during the pivotal traverses thereof.

2. An improved eyeglass frame hinge as claimed in claim 1, wherein said notch of said second hinge member is L-shaped, such that a portion thereof transverse to said trunion block receives said projection during a pivotal traverse and the remaining perpendicular portion receives said projection during the rearward alignment with each other of said first and second hinge members.

3. An improved eyeglass frame hinge as claimed in claim 2, wherein the side leg of said first hinge member remote from said projection has a vertical notch sized to receive said second hinge member when it is positioned to extend rearwardly of said first hinge member, whereby said first and second rearwardly extending hinge members are aligned in a vertical plane even though said second hinge member is assembled from a lateral direction into said compartment of said first hinge member.

* * * * *